April 3, 1956 — R. A. VAUGHAN — 2,740,544
PROTECTIVE DEVICE
Filed Aug. 11, 1950

INVENTOR.
ROY A. VAUGHAN
BY

United States Patent Office 2,740,544
Patented Apr. 3, 1956

2,740,544

PROTECTIVE DEVICE

Roy A. Vaughan, Manchester, Conn.

Application August 11, 1950, Serial No. 178,914

3 Claims. (Cl. 215—12)

The present invention relates generally to protective devices for frangible decanters and the like, and finds particular application to decanters, or the like, which are intended to contain hot liquid, or which must be heated directly, and which may be subject to considerable handling. A specific example of such a decanter, to which the present invention may be applied, is a coffee decanter.

In the course of utilization of decanters, and particularly of coffee decanters, in public eating places, considerable risk of breakage exists. Such decanters may be utilized to prepare, heat, store and serve coffee, and hence is subject to considerable manipulation and to the risk of cracking or breakage. When a decanter of the character described breaks or cracks the hot liquid contained therein is released, and may come into contact with personnel, causing serious burns. Further, the frangible material of which such decanters are normally made may scatter in small pieces, with subsequent danger of cutting personnel.

It is a first and basic object of the present invention to obviate these possibilities, or to reduce the probability of their occurrence, both by reducing the probability of cracking or breakage of the decanter, holding together the cracked glass, and by trapping the hot liquid contained therein and minimizing or preventing flow thereof from the decanter, should the latter be cracked or broken.

It is a further object of the invention to provide a structure capable of accomplishing the basic object of the invention, which shall be readily removable from and attachable to decanters, easily cleaned, economical of manufacture, and firmly secured to the decanter so that it may not accidentally become detached.

The above and still further objects, features and advantages of the invention will become apparent upon consideration of the following detailed description of various specific embodiments thereof, especially when taken in conjunction with the accompanying drawings, wherein.

Figure 1:
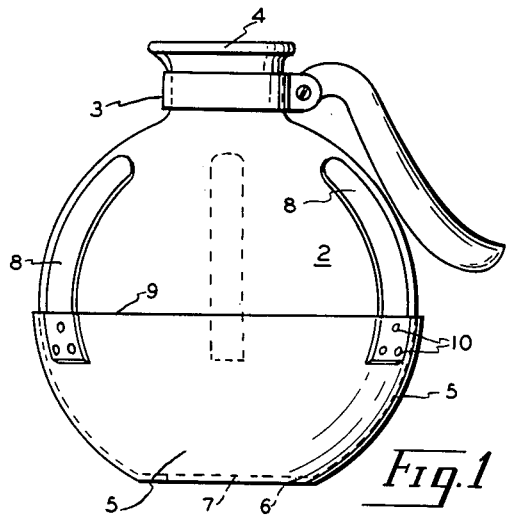
Figure 1 is a view in front elevation of a decanter having a protective device arranged in accordance with the invention.

Referring now more particularly to Figure 1 of the accompanying drawings, the reference numeral denotes generally a decanter of Pyrex or the like, having a substantially spherical or bowl-like body and a vertically extending neck 3, terminating in an annular lip 4. Decanters of the character illustrated and described are currently widely employed as coffee decanters, and for that reason the protective device of the invention has been applied thereto. It is to be undersood, however, that the protective device of the invention may be applied to decanters of other shapes, utilized for any desired purpose, and having any of various sizes.

The protective device of the invention comprises a metal covering 5, constructed to fit snugly against the lower portion of the decanter body 2, and having an open bottom 6, to enable heat to be applied directly to the bottom 7 of the decanter 1. A plurality of spring fingers 8, three of which are illustrated for the sake of example, are secured to the metal covering 5 adjacent its upper edge 9, and internally thereof, by means of rivets 10, or by welding, as proves most convenient. The spring fingers 8 snugly fit about the upper portion of the decanter body 2, along their entire lengths, and to assure that this shall be the case the spring fingers 8 are secured to the metal convering 5 within recesses or indentations 11 formed in the metal covering 5, and which are of precisely the widtth and depth required to accommodate the ends of the resilient fingers 8. There is accordingly provided close contact between the inner surfaces of the covering 5 and of the fingers 8 on the one band, and the outer surface of the bowl 2 of the decanter 1, on the other hand, at all points where these surfaces face one another.

The resilient fingers 8 possess sufficient resilience to assure that the covering 5 will be retained on the decanter, and in close contact therewith. At the same time this resilience enables the cover very rapidly to be removed from and placed on the bowl 2, without requiring the use of tools, great force, special manipulations, and the like.

Figure 2:
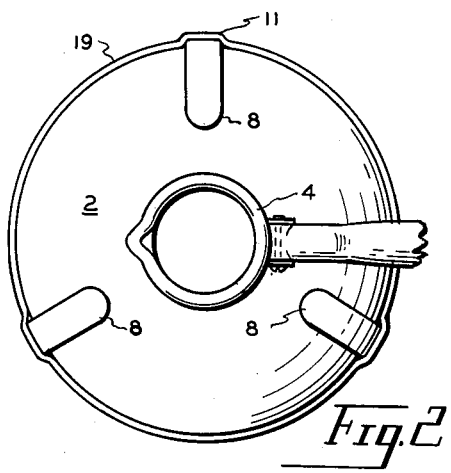
Figure 2 is a top plan view of the structure of Figure 1.
Figure 3:
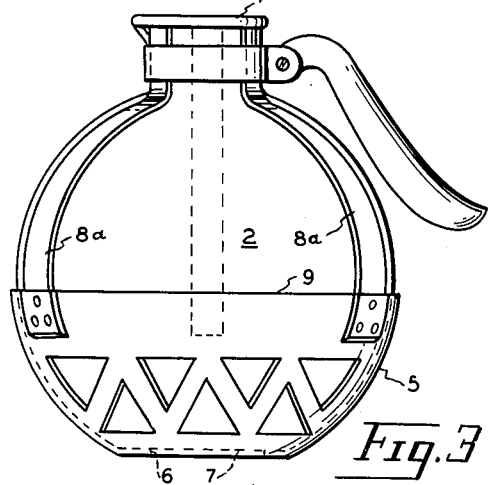
Figure 3 is a view in front elevation of a modification of the structure of Figure 1.
Figure 4:
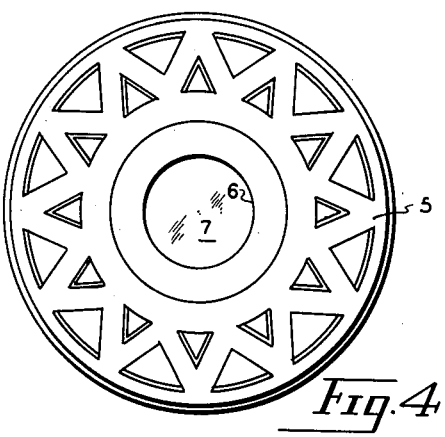
Figure 4 is a bottom plan view of the structure of Figure 3.
Figure 5:
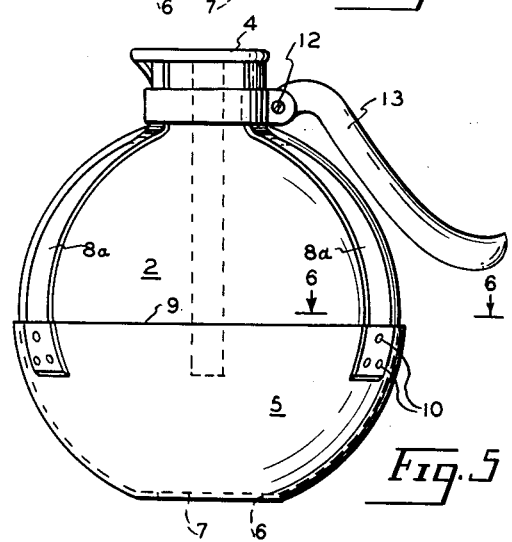
Figure 5 is a view in side elevation of a further and preferred modification of the structure of Figure 1; and, Figure 6 is a sectional view taken on the line 6—6 of Figure 5.
Figure 6:
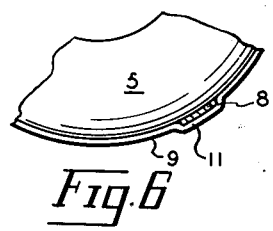

The modifications of the invention of Figures 1 and 2, which are illustrated in Figures 3, 4 and 5 respectively, involve one basic difference from the modifications illustrated in Figures 1 and 2, i. e., that the fingers 8 in Figures 3 and 5, and there identified by reference numeral 8a, are extended sufficiently that these fingers extend under an annular member 12, which surrounds the neck 3 of the decanter and to which is secured a handle 13. Thereby the fingers 8a, and hence the cover 5 may be secured more firmly to the decanter 1 than is possible when the resilience of the fingers alone is relied on, as in Figure 1. Additionally, the fingers 8a need not be resilient, which enables the protective device to be fabricated far more economically than is the case in the embodiment illustrated in Figure 1. In fact the entire device, including the fingers 8a, may then be made of relatively pliant metal, such as aluminum.

The distinction between the species of Figures 3, 4 and the species of Figure 5 resides in the fact that the cover 5 in Figures 3, 4 is of open work construction, while that of Figure 5, is solid. The modes of construction, use, attachment and removal are otherwise identical.

I have illustrated the upper ends of the fingers 8a as extending into contact with the under edge of the lip 4. This construction involves largely a matter of choice, and the fingers may be made shorter, if desired, so they extend under the annular member 12.

As in the embodiment of my invention illustrated in Figure 1, the under side of the cover 5 may be left open, or an aperture formed therein, to permit the direct application of heat to the underside of the bowl 2.

The protective device 5 serves, when attached, to protect the decanter 1 against breakage due to sudden impact, or the like, and in the event of cracking or breakage, tends to hold the decanter 1 together, thus preventing scattering of the frangible material of which the decanter is made, and rapid leakage of liquid therefrom, While I have described and illustrated specific forms of the invention it will be clear that variations thereof may be resorted to without departing from the true scope of the invention as defined in the appended claims.

What I claim and desire to secure by Letters Patent of the United States is:

1. A protective device for a decanter, or the like, having a generally spherical bowl, a neck and a lip, comprising, a snug fitting metallic covering for a lower portion of said bowl, said metallic covering fitting snugly around the contour of substantially the entire lower half of said bowl, a plurality of fingers attached to said metallic covering adjacent the upper edges thereof and extending over an upper portion of said bowl, and in snug contact therewith, said plurality of fingers maintaining said metallic covering in contact with said lower portion of said bowl, said covering having indentations for receiving said fingers at the points of attachment of said fingers to said metallic covering, each of said indentations having a width and a depth equal to the width and thickness of each of said fingers, whereby said fingers are in contact with said bowl over the entire length of said fingers.

2. The combination in accordance with claim 1 wherein said fingers are highly resilient.

3. The combination in accordance with claim 1 wherein said decanter is provided with an annulus surrounding said neck and with a handle secured to said annulus, and wherein said fingers are positioned between said annulus and said neck, whereby said annulus secures said fingers and said covering against easy removal from said decanter.

References Cited in the file of this patent

UNITED STATES PATENTS

| | | |
|---|---|---|
| 733,242 | Mauser | July 7, 1903 |
| 916,815 | Williams | Mar. 30, 1909 |
| 995,985 | Perry | June 20, 1911 |
| 1,782,962 | Hobbs | Nov. 25, 1930 |
| 1,977,365 | Wolcott | Oct. 16, 1934 |
| 2,293,483 | Allenby | Aug. 18, 1942 |
| 2,143,432 | Campbell | Mar. 23, 1943 |

FOREIGN PATENTS

| | | |
|---|---|---|
| 56,255 | Netherlands | Apr. 16, 1944 |